United States Patent [19]
Patel et al.

[11] 3,984,218
[45] Oct. 5, 1976

[54] PROCESS FOR THE REMOVAL OF VINYL CHLORIDE FROM GAS STREAMS

[75] Inventors: Piyush J. Patel, Somerville; Clay G. Thompson, Milltown; Edward J. Hourihan, Mount Holly, all of N.J.; Carl S. Stutts, Houston, Tex.

[73] Assignee: Tenneco Chemicals, Inc., Saddle Brook, N.J.

[22] Filed: Mar. 5, 1976

[21] Appl. No.: 664,221

[52] U.S. Cl. .................................. 55/59; 55/71; 55/74; 252/420
[51] Int. Cl.² ..................................... B01D 53/04
[58] Field of Search ............... 55/59, 62, 71, 74; 252/411 R, 420

[56] References Cited
UNITED STATES PATENTS

| | | | |
|---|---|---|---|
| 1,616,073 | 2/1927 | Arentz | 252/420 |
| 1,619,326 | 3/1927 | Backhaus | 252/420 |
| 1,619,327 | 3/1927 | Backhaus | 252/420 |
| 2,933,454 | 4/1960 | Repik et al. | 252/420 X |

FOREIGN PATENTS OR APPLICATIONS

| | | | |
|---|---|---|---|
| 487,833 | 11/1952 | Canada | 55/71 |

*Primary Examiner*—Charles N. Hart
*Assistant Examiner*—Robert H. Spitzer
*Attorney, Agent, or Firm*—Evelyn Berlow

[57] ABSTRACT

Vinyl chloride is removed from gas streams that contain from 10 ppm to 100 mole percent of vinyl chloride by passing the gas stream through a bed of coconut shell-derived or petroleum-derived activated carbon. The exit gas stream contains less than 5 ppm of vinyl chloride.

The vinyl chloride-saturated carbon is treated with steam at 100°–150°C. to desorb the vinyl chloride, which is then recovered. The wet carbon is contacted with an inert gas at 90°–150°C. until its water content is less than 1% by weight; the hot dry carbon is cooled to ambient temperature by contacting it with a cold inert gas. The regenerated activated carbon is then used to remove additional vinyl chloride from the gas stream.

The vinyl chloride adsorption-carbon regeneration cycle can be repeated for long periods of time without loss of adsorptive capacity of the activated carbon or formation of polyvinyl chloride on the surface of the carbon.

8 Claims, No Drawings

PROCESS FOR THE REMOVAL OF VINYL CHLORIDE FROM GAS STREAMS

This invention relates to a process for the removal of vinyl chloride from gas streams.

When vinyl chloride is polymerized in an aqueous medium by suspension or emulsion polymerization techniques, there is obtained a latex or slurry that contains polyvinyl chloride and up to about 5% by weight of vinyl chloride. Most of the unreacted monomer is usually removed by heating the latex or slurry under reduced pressure to about 65°C. This stripping process produces large volumes of gases that contain low concentrations of vinyl chloride. In addition, gas streams that contain vinyl chloride result from inert gas purging of slurry tanks, blend tanks, condensers, centrifuges, and other equipment used in the manufacture of polyvinyl chloride to reduce explosion hazard, to remove last traces of monomer, and to improve equipment efficiency.

In view of the recently-developed safety standards that require that the amount of vinyl chloride in the atmosphere that workers breathe be maintained at very low levels, it is necessary that the vinyl chloride in the effluent gas streams be recovered or destroyed so that these requirements can be met.

A number of procedures have been proposed for the removal of vinyl chloride from gas streams that contain a low concentration of vinyl chloride, but none has proven to be entirely satisfactory. The use of solvents, such as dichloroethane and carbon tetrachloride, to remove vinyl chloride from gas streams is effective, but it is generally uneconomical because for efficient operation it requires that the gas stream be cooled to temperatures below 0°C. and the solvent system be maintained under pressure. Combustion of the gas stream to oxidize vinyl chloride to carbon dioxide, water, and hydrogen chloride followed by caustic scrubbing of the off-gas to remove the hydrogen chloride from it is undesirable because of the cost of the equipment and fuel that are required. Refrigerated vent coolers, which are useful only when the volume of inert gas is very low, have been found to be relatively inefficient as well as costly to operate.

Procedures in which activated carbon is used to remove vinyl chloride from gas streams that contain small amounts of vinyl chloride have heretofore been unsatisfactory when used on a commercial scale because the gradual inactivation of the carbon resulting from the build-up of polymer on the surface of the carbon and from the collapse of micropore walls makes necessary the replacement of the activated carbon at frequent intervals. The use of additives in the gas stream or the activated carbon to maintain the adsorptive capacity of the carbon at the desired level has been proposed. For example, in copending patent application Ser. No. 583,491, which was filed on June 3, 1975, Sudduth et al. disclosed a process in which gas streams containing small amounts of vinyl chloride are contacted with ozone in the presence of activated carbon to reduce their vinyl chloride content to 1 ppm or less. This process can be run for long periods of time without a substantial decrease in the adsorptive capacity of the activated carbon. In U.S. Pat. No. 3,796,023, Raduly disclosed a process in which a gas stream containing vinyl chloride was passed through a layer of activated carbon while the carbon was cooled by means of cooling elements disposed in the layer. He reported that the activated carbon quickly lost its adsorptive capacity unless it had been impregnated with hydroquinone.

In accordance with this invention, an improved process has been developed for the removal of vinyl chloride from gas streams. In this process, the vinyl chloride in a gas stream is adsorbed on the surface of coconut shell-derived or petroleum-derived activated carbon, the vinyl chloride is desorbed from the carbon, and the activated carbon is regenerated by the process that is hereinafter described in detail. This process, which is simple and inexpensive to operate, reduces the vinyl chloride content of gas streams to less than 5 ppm and allows the vinyl chloride that has been removed from the gas stream to be recovered and reused. The process has been operated for more than 80 vinyl chloride adsorption-carbon regeneration cycles without an appreciable decrease in the adsorptive capacity of the activated carbon or the necessity of replacing the activated carbon.

The activated carbons that can be used in the process of this invention are microporous carbons that are made by carbonizing coconut shells or by-product streams from petroleum refining operations. They are characterized by high surface area, fine pore structure, high density, and high adsorptive capacity. They have a large internal surface area available for vinyl chloride adsorption as is indicated by iodine numbers of at least 1100 milligrams per gram, preferably at least 1200 milligrams per gram, and total surface areas of at least 1150 square meters per gram. This adsorptive capacity does not decrease appreciably even after the carbon has been used in a large number of vinyl chloride adsorption-carbon regeneration cycles. While high surface area activated carbons derived from other carbonaceous materials may have high initial adsorptive capacity for vinyl chloride, they usually lose much of their adsorptive capacity after 20 to 30 vinyl chloride adsorption-carbon regeneration cycles as the result of breakage of the walls of the micropores. Particularly good results have been obtained using the coconut shell-derived activated carbon that is marketed as Pittsburgh Type PCB Activated Carbon. This material has the following characteristics:

| | |
|---|---|
| Total Surface Area ($N_2$, BET Method), m.$^2$/g. | 1150–1250 |
| Apparent Density (Bulk Density, dense packing), g/cc | 0.44 |
| Particle Density (Hg Displacement), g/cc | 0.850 |
| Real Density (Hg Displacement), g/cc | 2.2 |
| Pore Volume (Within Particle), cc/g | 0.72 |
| Voids in Dense Packed Column, % | 50.0 |
| Specific Heat at 100°C. | 0.25 |
| Iodine Number, mg/g minimum | 1200 |
| Carbon Tetrachloride Adsorption, wt. % minimum | 60 |
| Hardness Number, minimum | 92 |

The quantity of activated carbon that is used is not critical and depends to a large extent upon the amount of vinyl chloride that is present in the gas stream.

The adsorptive capacity of coconut shell-derived or petroleum-derived activated carbon is directly proportional to the vinyl chloride concentration in the gas stream. When the gas stream contains more than about 10 mole percent of vinyl chloride, the adsorptive capacity of the activated carbon is between 12% and 25% by weight. The adsorptive capacity of the carbon is greatest at temperatures below 30°C.

In the process of this invention, a gas stream that contains from about 10 ppm to 100 mole percent of vinyl chloride is passed downward through a bed of coconut shell-derived or petroleum-derived activated carbon until breakthrough occurs. At this point, the vinyl chloride content of the exit gas stream rises rapidly from less than 5 ppm to more than 10 ppm.

The gas stream that is passed through the bed of activated carbon may be at a temperature between 0°C. and 40°C.; it is preferably at 20°C. to 30°C. when it is contacted with the activated carbon. The presence of recovered vinyl chloride in the gas stream does not have an adverse effect on the adsorptive capacity of the activated carbon or result in the formation of polyvinyl chloride on the surface of the carbon. In addition to vinyl chloride, the gas stream may contain nitrogen, oxygen, air, carbon dioxide, and the like. The rate at which the gas stream is passed through the carbon bed is not critical. The adsorptive capacity of the activated carbon has been found to be relatively unchanged at superficial velocities of from 10 to 100 feet per minute.

Following the breakthrough, vinyl chloride is desorbed from the saturated carbon by passing steam at 100°–150°C., and preferably at 115°–130°C., and 1 atmosphere to 3 atmospheres pressure upward through the carbon bed until at least 99% by weight of the vinyl chloride has been removed from the carbon. The steam leaving the carbon bed is directed to a vinyl chloride recovery system. The carbon, which is saturated with water and which contains up to about 1% by weight of the vinyl chloride that had been adsorbed, is then contacted with an inert gas, which is preferably nitrogen or carbon dioxide, at a temperature between 90°C. and 150°C., preferably between 120°C. and 140°C., until it contains less than 1% by weight of water. The vinyl chloride content of the stream of hot inert gas leaving the activated carbon may initially be as high as 400 ppm; it usually falls to less than 10 ppm before the drying of the carbon has been completed. The vinyl chloride-containing inert gas stream may be sent to the vinyl chloride recovery system, recycled, or discarded. Then nitrogen or another inert gas at a temperature below 30°C. and preferably below 20°C. is passed through the hot dry carbon to cool it to a temperature below 30°C. The cold inert gas stream leaving the carbon bed usually contains less than 5 ppm of vinyl chloride. It may if desired be recycled. The activated carbon, which contains less than 0.5% by weight of water and substantially no vinyl chloride, can then be used to remove additional amounts of vinyl chloride from the gas stream.

The invention is further illustrated by the following examples.

EXAMPLE 1

A gas stream that consisted of 29 mole percent of vinyl chloride that had been recovered from a polyvinyl chloride reactor and 71 mole percent of air, which was at about 20°C., was passed in a downward direction through a jacketed steel pipe column (1.61 inch I.D.) that was 62 inches long and that contained about 1300 grams of activated carbon at the nominal velocity of 29 feet per minute. Exit gas samples were collected at frequent intervals. The amount of non-adsorbed vinyl chloride in the exit gas stream was determined by analysis with a Hewlett-Packard 5700A Gas Chromatograph Flame Ionization Detector with a sensitivity of 0.1 part per million. Prior to breakthrough, the exit gas stream contained less than 5 ppm of vinyl chloride. When breakthrough occurred, as indicated by a sudden increase in the vinyl chloride content of the gas stream to more than 10 ppm, the passage of the gas stream through the carbon bed was discontinued.

Clean steam at 120°–125°C. was passed upward through the vinyl chloride-saturated activated carbon for 45 minutes during which time 99.4% by weight of the adsorbed vinyl chloride was removed from the carbon. The effluent steam was sent to a vinyl chloride recovery system. Immediately after the treatment with steam the carbon, which was saturated with water and a small amount of vinyl chloride, was dried by passing nitrogen at 120°C. downward through it for 60 minutes while maintaining the column jacket temperature at 135°–140°C. The carbon, which then contained less than 1% by weight of water, was cooled by passing nitrogen at 17.5°C. through it in a downward direction for 60 minutes. The activated carbon regenerated in this way contained less than 0.3% by weight of water and substantially no vinyl chloride.

The average vinyl chloride content of the nitrogen streams leaving the carbon bed was less than 4 ppm.

The regenerated activated carbon was recycled and used to remove additional amounts of vinyl chloride from the gas stream. The vinyl chloride adsorption and desorption and the carbon regeneration steps were repeated until a total of 82 cycles had been completed or until the adsorptive capacity of the carbon had fallen below 10% by weight.

In the tests, the following types of activated carbon were used:

Type A — Coconut shell-derived activated carbon (Pittsburgh Type PCB Activated Carbon)

Type B — Petroleum-derived activated carbon (Witco Activated Carbon 256)

Type C — Bituminous Coal-derived activated carbon (Pittsburgh Type BPL Activated Carbon)

The results obtained using the three types of carbon are summarized in Table I. In this table and in Table II, the bed capacity is the weight of vinyl chloride adsorbed as a percentage of the weight of activated carbon. It was determined by using the following equation:

$$\% \text{ Bed Capacity} = \frac{\text{grams Vinyl Chloride Adsorbed}}{\text{grams Activated Carbon}} \times 100$$

Table I

Cyclic Tests of the Bed Capacity of Activated Carbon Used to Remove Vinyl Chloride from a Gas Stream Containing 29 Mole Percent of Vinyl Chloride

| Cycle Number | Bed Capacity (%) of Activated Carbons | | |
|---|---|---|---|
| | Type A | Type B | Type C |
| 1 | 25.6 | 14.4 | 19.4 |
| 3 | 21.7 | 11.6 | 15.1 |
| 5 | 22.1 | 10.8 | 18.7 |
| 7 | 22.1 | — | 15.1 |
| 9 | 21.4 | 11.3 | 18.7 |
| 11 | 21.4 | 11.3 | 18.0 |
| 13 | 22.7 | 11.3 | 17.3 |
| 15 | 22.0 | 11.3 | 18.4 |
| 17 | 21.2 | 11.3 | 14.4 |
| 19 | 20.9 | — | 18.0 |
| 21 | 21.8 | — | 12.2 |
| 23 | 21.4 | 11.5 | 11.2 |
| 25 | 21.9 | 10.5 | 9.8 |

Table I-continued

Cyclic Tests of the Bed Capacity of Activated Carbon Used to Remove Vinyl Chloride from a Gas Stream Containing 29 Mole Percent of Vinyl Chloride

| Cycle Number | Bed Capacity (%) of Activated Carbons | | |
|---|---|---|---|
| | Type A | Type B | Type C |
| 27 | 22.7 | 11.6 | 6.1 |
| 30 | 24.9 | 11.6 | — |
| 35 | 19.0 | 11.7 | — |
| 40 | 13.4 | 12.1 | — |
| 45 | 12.2 | 11.7 | — |
| 50 | 11.2 | 12.1 | — |
| 55 | 12.6 | 12.1 | — |
| 60 | 11.8 | 12.6 | — |
| 65 | 13.5 | 12.1 | — |
| 70 | 11.0 | 12.5 | — |
| 75 | 13.2 | 12.1 | — |
| 80 | 12.3 | 11.0 | — |
| 82 | 13.6 | — | — |

From the data in Table I, it will be seen that the adsorptive capacity of the coconut shell-derived activated carbon (Type A) fell from about 22% to about 13% after 35 cycles. It then remained between about 11% and 13.6% until the evaluation of this carbon was purposely terminated after 82 cycles. The petroleum-derived activated carbon (Type B) had a lower initial bed capacity, and this capacity did not change appreciably over 80 cycles. The bituminous coal-derived activated carbon (Type C) had a relatively high initial bed capacity. Its capacity, however, had fallen to 6% after 27 cycles, when the evaluation of this activated carbon was discontinued.

When the cyclic tests had been completed, it was found that the Type A and Type B activated carbon had not changed in color. Analysis of the carbon indicated vinyl chloride had not polymerized in the carbon bed.

EXAMPLE 2

The procedure described in Example 1 was repeated using a different coconut shell-derived activated carbon, desorbing the vinyl chloride by passing clean steam at 130°C. through it for 45 minutes, and regenerating the carbon by passing nitrogen at 125°C. through it for 60 minutes and then nitrogen at 15°C. through it for 60 minutes.

The results obtained in a long series of cyclic runs are summarized in Table II.

From the data in Table II, it will be seen that the coconut shell-derived activated carbon retained its relatively high bed capacity throughout the 95 cycles.

Table II

Cyclic Tests of the Bed Capacity of a Coconut-Derived Activated Carbon to Remove Vinyl Chloride from a Gas Stream Containing 29 Mole Percent of Vinyl Chloride

| Cycle No. | Bed Capacity (%) | Cycle No. | Bed Capacity (%) | Cycle No. | Bed Capacity (%) |
|---|---|---|---|---|---|
| 1 | 18.6 | 19 | 15.8 | 60 | 14.4 |
| 3 | 14.7 | 21 | 15.8 | 65 | 16.0 |
| 5 | 15.1 | 23 | 16.9 | 70 | 14.6 |
| 7 | 16.7 | 25 | 15.4 | 75 | 15.8 |
| 9 | 15.1 | 30 | 16.8 | 80 | 14.4 |
| 11 | 15.5 | 35 | 14.8 | 85 | 14.5 |
| 13 | 15.1 | 40 | 12.8 | 90 | 14.8 |
| 15 | 15.1 | 45 | 14.0 | 95 | 14.4 |
| 17 | 15.9 | 50 | 13.6 | | |
| | | 55 | 15.6 | | |

EXAMPLE 3

A gas stream that contained 25% by weight of vinyl chloride, 68% by weight of nitrogen, and 7% by weight of oxygen and that was maintained at 0°C. was passed through a jacketed column that contained 1300 grams of petroleum-derived activated carbon (Witco Activated Carbon 337) at the nominal velocity of 30 feet per minute. The gas stream was passed through the carbon until the exit gas contained more than 10 ppm of vinyl chloride.

Steam at 120°C. was passed through the bed of saturated activated carbon until 99.5% of the vinyl chloride had been desorbed. Nitrogen at 150°C. was passed through the wet carbon for 40 minutes to reduce its water content to less than 1%. The hot dry carbon was then contacted with nitrogen at 20°C. for 80 minutes to cool it to 25°C.

The adsorptive capacity of the activated carbon remained at about 19% during a long series of cyclic runs.

EXAMPLE 4

The procedure described in Example 3 was repeated except that the gas stream was maintained at 20°–25°C. during the adsorption step. The adsorptive capacity of the activated carbon remained at about 16% during a long series of cyclic runs.

What is claimed is:

1. In the process for the removal of vinyl chloride from gas streams wherein the gas streams are contacted with activated carbon until the surface of the carbon is saturated with vinyl chloride, vinyl chloride is desorbed from the carbon, and the carbon is regenerated and recycled, the improvements that consist essentially of the steps of
   a. passing a gas stream that contains from 10 ppm to 100 mole percent of vinyl chloride through a bed of activated carbon, said carbon being selected from the group consisting of coconut shell-derived activated carbon and petroleum-derived activated carbon and having an iodine number of at least 1100 milligrams per gram and a total surface area of at least 1150 square meters per gram, until the gas stream leaving the bed of vinyl chloride-saturated carbon contains more than 10 ppm of vinyl chloride;
   b. passing steam at 100°C. to 150°C. through the bed of vinyl chloride-saturated activated carbon until at least 99% by weight of the vinyl chloride has been desorbed from the carbon and the carbon is saturated with water;
   c. directing the steam leaving the carbon bed to a vinyl chloride recovery system;
   d. passing a stream of inert gas at 90° to 150°C. through the bed of water-saturated activated carbon until the hot carbon contains less than 1% of water;
   e. passing a stream of inert gas at a temperature below 30°C. through the hot carbon until the carbon has been cooled to a temperature below 30°C.; and
   f. repeating Steps (a) to (e).

2. The process of claim 1 wherein the activated carbon that is used in Step (a) is a coconut shell-derived activated carbon that has an iodine number of at least 1200 mg./g.

3. The process of claim 1 wherein the activated carbon that is used in Step (a) is a petroleum-derived activated carbon.

4. The process of claim 1 wherein the Step (b) steam at 115°–130°C. is passed through the bed of vinyl chloride-saturated activated carbon.

5. The process of claim 1 wherein the inert gas used in Step (d) is nitrogen.

6. The process of claim 1 wherein in Step (d) nitrogen at 120° to 140°C. is passed through the bed of water-saturated activated carbon.

7. The process of claim 1 wherein the inert gas used in Step (e) is nitrogen.

8. The process of claim 1 wherein in Step (e) nitrogen at a temperature below 20°C. is used to cool the hot carbon.

* * * * *

UNITED STATES PATENT OFFICE
CERTIFICATE OF CORRECTION

Patent No. 3,984,218          Dated October 5, 1976

Inventor(s) Piyush J. Patel et al

It is certified that error appears in the above-identified patent and that said Letters Patent are hereby corrected as shown below:

Column 7, line 4, after "wherein" change "the" to read -- in --.

Signed and Sealed this

Seventh Day of December 1976

[SEAL]

Attest:

RUTH C. MASON  
*Attesting Officer*

C. MARSHALL DANN  
*Commissioner of Patents and Trademarks*